(12) United States Patent
Cruickshank et al.

(10) Patent No.: US 8,371,332 B2
(45) Date of Patent: Feb. 12, 2013

(54) MODULAR PRESSURE BALANCING VALVE

(75) Inventors: Richard Cruickshank, Mississauga (CA); Frederick Leung, Toronto (CA); Gerry Larcina, Toronto (CA)

(73) Assignee: Grohe AG, Hemer (DE)

( * ) Notice: Subject to any disclaimer, the term of this patent is extended or adjusted under 35 U.S.C. 154(b) by 880 days.

(21) Appl. No.: 12/422,033

(22) Filed: Apr. 10, 2009

(65) Prior Publication Data

US 2009/0260696 A1   Oct. 22, 2009

Related U.S. Application Data

(60) Provisional application No. 61/044,033, filed on Apr. 10, 2008.

(51) Int. Cl.
  *F16K 11/20* (2006.01)

(52) U.S. Cl. ............ 137/597; 137/454.2; 137/606; 137/271

(58) Field of Classification Search ............... 137/454.2, 137/606, 271, 597, 468
See application file for complete search history.

(56) References Cited

U.S. PATENT DOCUMENTS

| | | | | |
|---|---|---|---|---|
| 4,782,853 A * | 11/1988 | Moen | | 137/454.6 |
| 4,979,530 A * | 12/1990 | Breda | | 137/100 |
| 5,425,394 A * | 6/1995 | Clare | | 137/270 |
| 5,884,652 A * | 3/1999 | Yeh et al. | | 137/98 |
| 6,123,094 A * | 9/2000 | Breda | | 137/98 |
| 2011/0126919 A1* | 6/2011 | Izzy et al. | | 137/468 |

\* cited by examiner

*Primary Examiner* — Craig Schneider
*Assistant Examiner* — Ian Paquette
(74) *Attorney, Agent, or Firm* — Muncy, Geissler, Olds & Lower, PLLC

(57) ABSTRACT

A modular valve is provided. The modular valve includes a valve body having a pair of inlet ports and a pair of outlet ports. The pair of inlet ports each includes an integral stop valve and check valve. The valve body includes a cavity configured to selectively receive a pressure balancing cartridge or a thermostatic cartridge assembly.

17 Claims, 17 Drawing Sheets

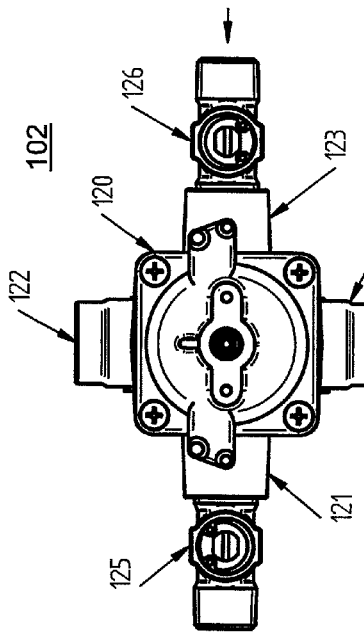
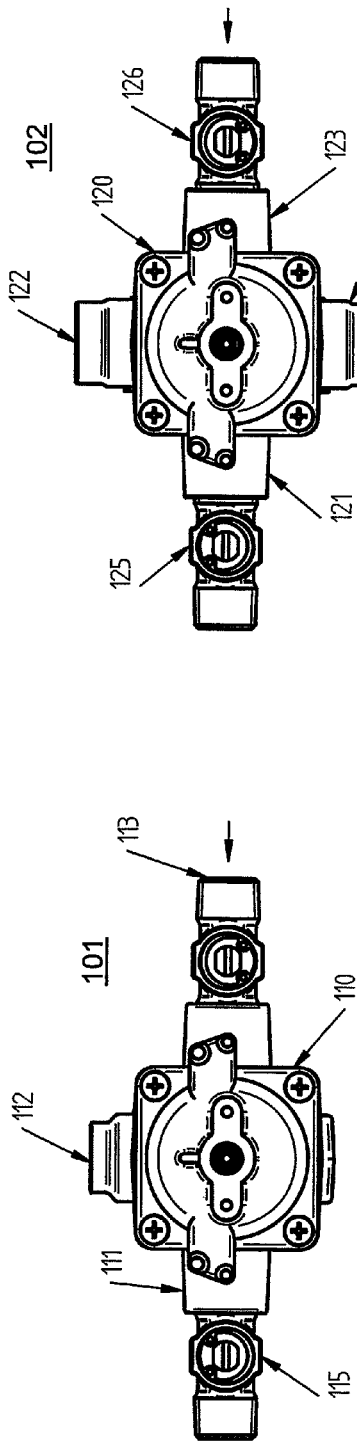
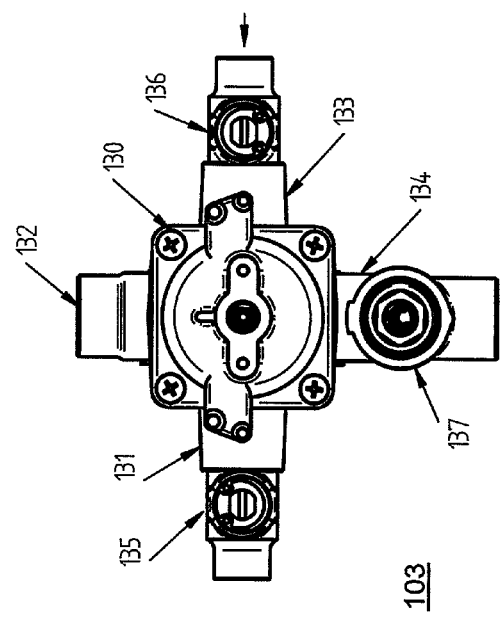

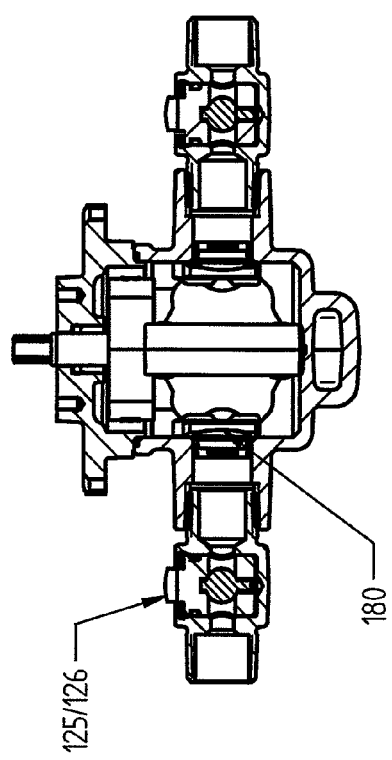
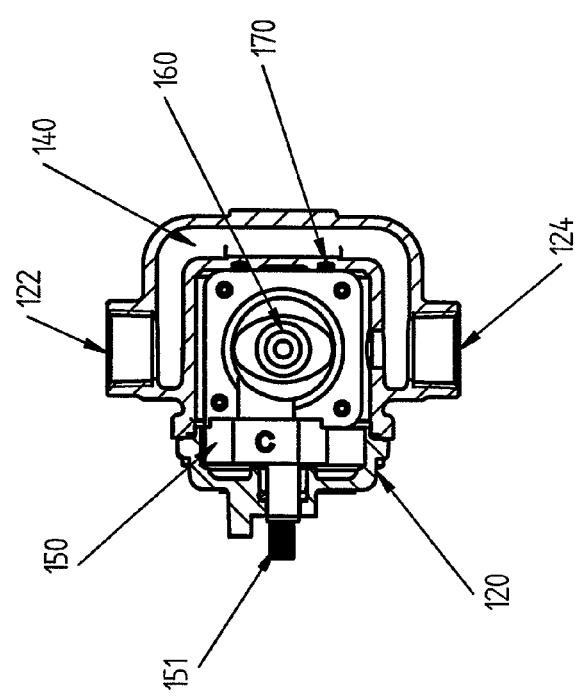
FIGURE 2(a)
CONVENTIONAL ART
FIGURE 2(b)
CONVENTIONAL ART

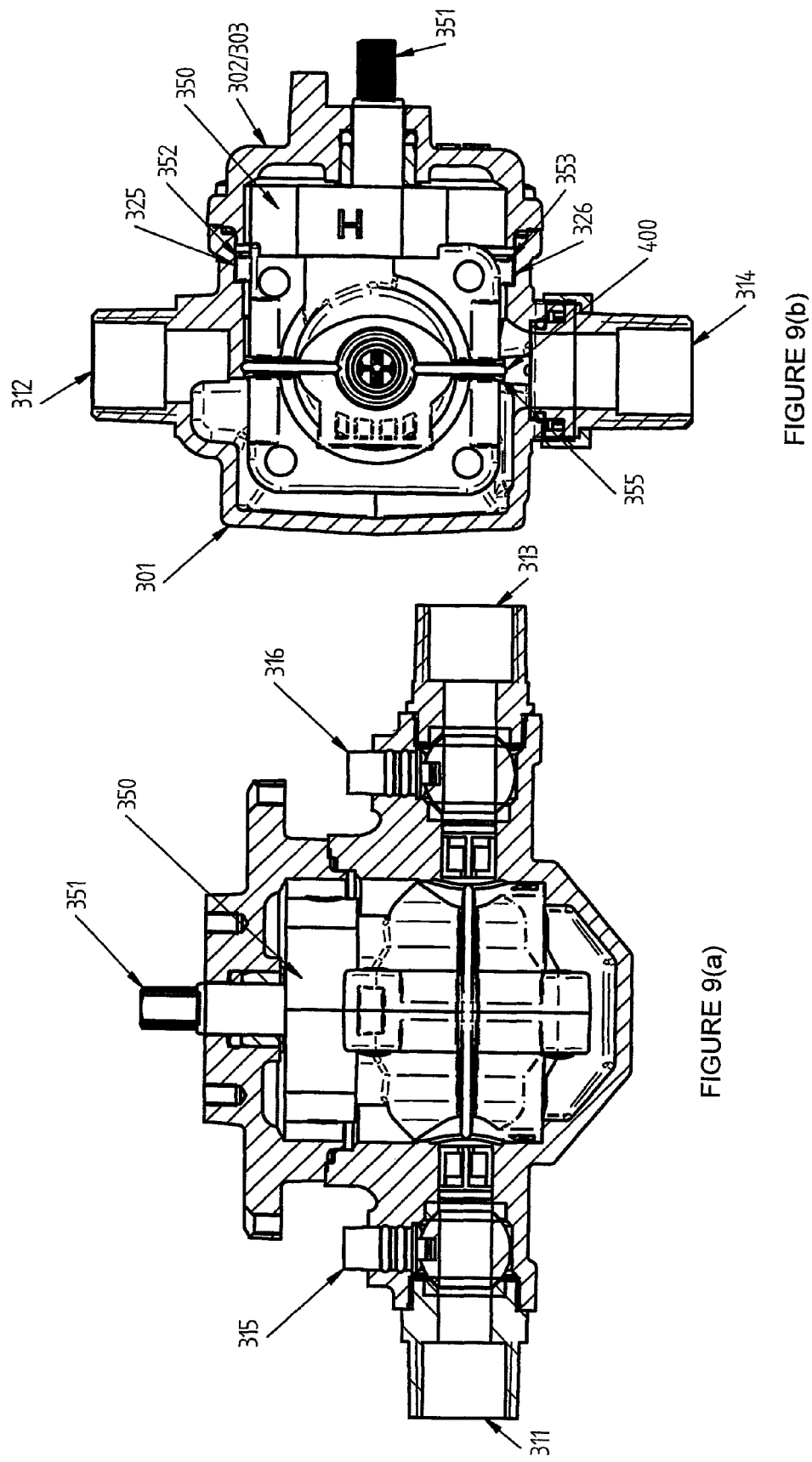

MODULAR PRESSURE BALANCING VALVE

This nonprovisional application claims priority to U.S. Provisional Application No. 61/044,033, which was filed on Apr. 10, 2008, and which is herein incorporated by reference.

BACKGROUND OF THE INVENTION

1. Field of the Disclosure

The present invention relates to a valve, and more particularly, to a modular pressure balancing valve, a pressure balancing cartridge, a thermostatic cartridge assembly, and a diverter assembly.

2. Background

In conventional pressure balancing valve assemblies, a separate valve body (e.g., a dedicated valve body) is used for each desired valve configuration. In addition, separate valve bodies also are used for thermostatic cartridges.

For example, in conventional valve assemblies, separate pressure balancing valves must be used for each of a shower only valve, a tub and shower valve, and a valve with an integral diverter, ect. Accordingly, the use of separate valves for each configuration results in increased inventory costs and material costs, since numerous individual valves must be manufactured, shipped, and stocked, for example, by the manufacturer, distributor, or plumber for each configuration.

Moreover, in some conventional valve assemblies, the stop valves are separate components that are installed into the respective valve body being used for the particular valve configuration. This results in having to use more material in the assembled valve and also results in a greater distance across the inlet ports.

FIGS. 1(a), 1(b), 1(c), 2(a), and 2(b) illustrate conventional valve assemblies for use, for example, as a shower only valve, a tub and shower valve, and a valve with an integral diverter, etc.

FIG. 1(a) illustrates a conventional 3-port valve assembly 101. As shown in FIG. 1(a), the valve body is cast with 3 ports, including inlet ports 111 and 113 and outlet port 112. The stop valves 115 and 116 are separate components that are installed in the inlet ports 111 and 113. A valve cover 110 covers a cavity having a conventional pressure balancing valve.

FIG. 1(b) illustrates a conventional 4-port valve assembly 102. As shown in FIG. 1(b), the valve body is cast with 4 ports, including inlet ports 121 and 123, and outlet ports 122 and 124. The stop valves 125 and 126 are separate components that are installed in the inlet ports 121 and 123. A valve cover 120 covers a cavity having a conventional pressure balancing valve.

FIG. 1(c) illustrates another conventional 4-port valve assembly 103. As shown in FIG. 1(c), the valve body is cast with 4 ports, including inlet ports 131 and 133, and outlet ports 132 and 134. The stop valves 135 and 136 are separate components that are installed in the inlet ports 131 and 133. The outlet port 134 is cast such that a diverter 137 can be accommodated therein. A valve cover 130 covers a cavity having a conventional pressure balancing valve.

With reference to FIGS. 2(a) and 2(b), cut-away views of a conventional valve body and a conventional pressure balancing cartridge will now be described.

As shown in FIG. 2(a), conventional valves include a separate insert 180 to facilitate assembly.

FIG. 2(b) shows a cut-away view of a conventional valve 102, as shown in FIG. 1(b), which can provide flow to a shower, and which includes an upper outlet port 122 and a lower outlet port 124. The conventional valve 102 with flow to the shower (e.g., tub and shower, and diverter valves) requires a separate water channel, such as back channel 140, which is cast into the valve body to direct water to the upper outlet port 122 (e.g., the shower outlet). A conventional pressure balancing cartridge 150 is provided in a cavity in the valve body. The pressure balancing cartridge 150 includes a valve stem 151, which can be connected to a handle or knob (not shown). A valve cover 120 covers the cavity. The pressure balancing cartridge 150 may include alignment pins 170, which are aligned with holes in the inner most surface of the cavity of the valve body when assembled. The pressure balancing cartridge 150 may include a plurality of O-rings for sealing the pressure balancing cartridge 150 within the cavity of the valve body. For example, the pressure balancing cartridge 150 shown in FIG. 2(b), has an O-ring for each inlet, as well as two O-rings on the inserts and two O-rings on the cover.

The use of a separate channel, such as the back channel 140, in conventional valves requires more material and a larger valve body. Moreover, a more complicated core is needed to cast the valve body having the separate channel. Thus, the conventional valve assemblies can increase the manufacturing costs associated with each of the dedicated valves. Additionally, the separate channel can increase the valves susceptibility to clogging, corrosion, and/or leakage, etc. Furthermore, in conventional valve assemblies, the alignment and seating of the pressure balancing cartridge can be difficult, for example, because the correct alignment of the cartridge in the valve body may not be visually inspected or confirmed.

SUMMARY

Exemplary embodiments of the invention are directed to a valve, and more particularly, to a modular pressure balancing valve.

In an exemplary embodiment, a modular valve includes a valve body having a pair of inlet ports and a pair of outlet ports. The pair of inlet ports each includes an integral stop valve and check valve. The valve body includes a cavity configured to selectively receive a pressure balancing cartridge or a thermostatic cartridge assembly.

In another embodiment, a modular valve includes a valve body having a pair of inlet ports and a pair of outlet ports. The pair of inlet ports each includes an integral stop valve and check valve, and the valve body includes a cavity. The valve body further includes a pressure balancing cartridge retained in the cavity of the valve body.

In yet another embodiment, a modular valve includes a valve body having a pair of inlet ports and a pair of outlet ports. The pair of inlet ports each includes an integral stop valve and check valve, and the valve body includes a cavity. The valve body further includes a holder retained in the cavity of the valve body, and a thermostatic cartridge received in the holder.

In another embodiment, a pressure balancing cartridge includes an integral diverter channel formed around a central axis of the pressure balancing cartridge.

In yet another embodiment, a diverter assembly includes a diverter connection having two openings in an inlet side of the diverter connection, and a diverter having two flow channels joined to the two openings of the diverter connection.

The embodiments of the modular valve body can provide a plurality of configurations by attaching different outlet connectors to form, for example, a shower only valve, a tub and shower valve, a valve with an integral diverter, etc. According to embodiments of the invention, a single modular valve body can provide the functionality of three conventional, dedicated valve bodies. According to the embodiments of the invention, only a single valve body needs to be stocked by the manufacturer, distributor, or plumber along with the different outlet pieces, which improves and streamlines the supply chain to the customer. Moreover, according to the embodiments, fewer valve bodies, and thus, fewer components are needed for each valve configuration.

Furthermore, the overall size of the valve can be reduced, according to the embodiments, compared to the conventional valves. The amount of material needed to manufacture the valves also can be reduced, thereby reducing material costs, weight, etc. of the modular valve. Thus, the modular valve according to the embodiments of the invention can reduce manufacturing costs, shipping costs, inventory costs, and/or installation costs. Moreover, the space requirements for installing the valves also are reduced, thereby simplifying the installation of the valves and increasing the number of available applications of the valve.

According to the embodiments, the need for a separate thermostatic valve body also can be eliminated, thereby further reducing manufacturing costs, inventory costs, and/or installation costs. Moreover, the embodiments of the modular valve can provide for field upgrading from a pressure balancing valve to a thermostatic valve, which also reduces manufacturing costs, inventory costs, and/or installation costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1(a) illustrates a conventional 3-port valve;

FIG. 1(b) illustrates a conventional 4-port valve;

FIG. 1(c) illustrates another conventional 4-port valve;

FIGS. 2(a) and 2(b) illustrate cut-away views of a conventional valve body and a conventional pressure balancing cartridge;

FIGS. 9(a) and 9(b) illustrate cut-away views of a modular valve body and pressure balancing cartridge according to an embodiment of the invention;

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments of the invention include the discussed feature, advantage or mode of operation.

Exemplary embodiments of the invention will be described with reference to FIGS. 3 to 13.

Figure 7:
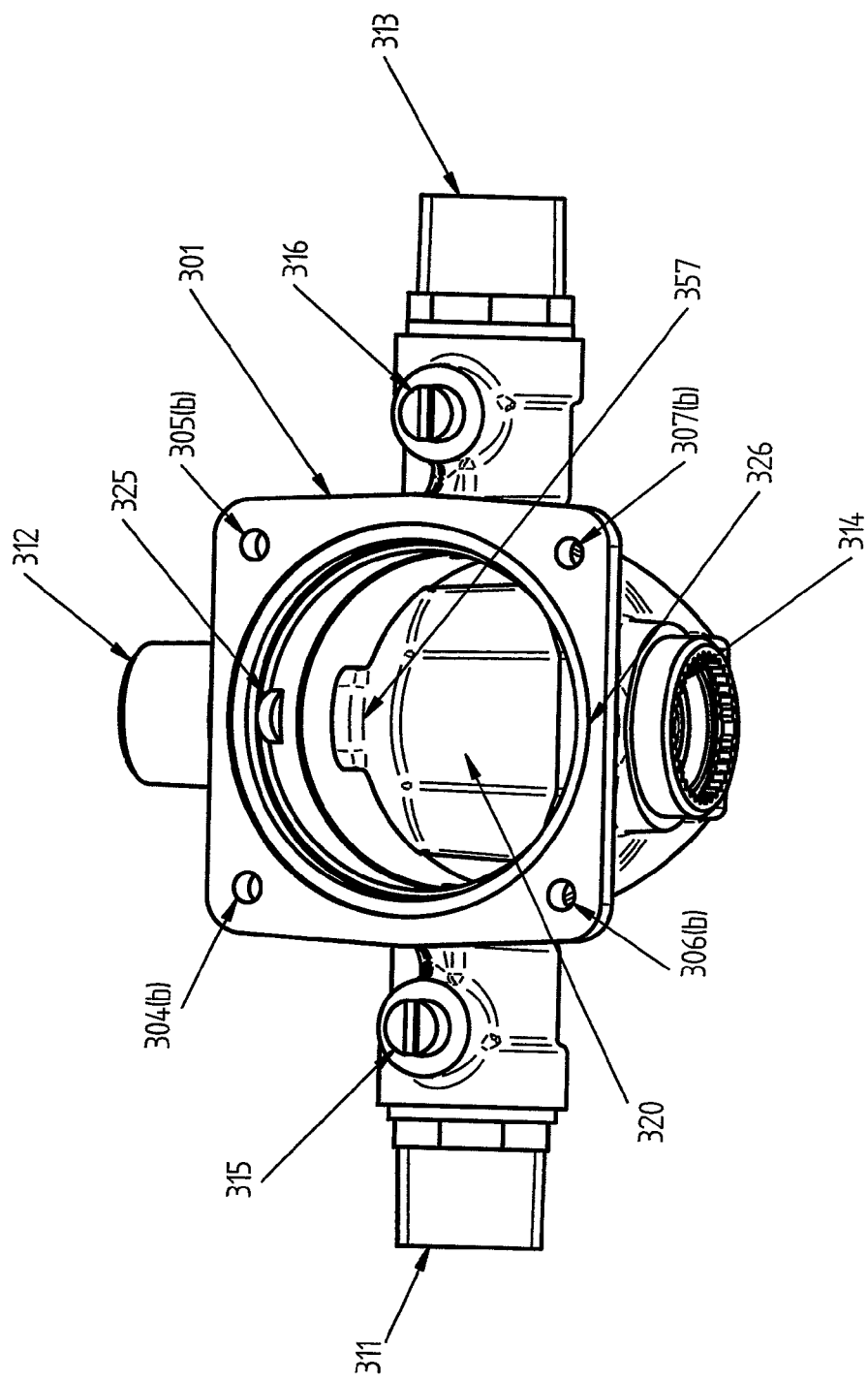
FIG. 7 illustrates a perspective view of a modular valve body according to an embodiment of the invention.

As shown, for example, in FIGS. 3 to 7, an exemplary embodiment of the modular valve 300 includes a modular valve body 301 having inlet ports 311 and 313, and outlet ports 312 and 314. The modular valve body 301 includes a valve cover (e.g., 302 or 303) that covers a cavity 320, which is described in more detail below, for receiving a pressure balancing cartridge 350 or a thermostatic cartridge assembly (e.g., 500 or 600), which also are described in more detail below. As shown in FIG. 7, the exemplary cavity 320 is a cylindrical opening having a longitudinal axis extending into the modular valve body 301. The cavity 320 includes an upper outlet 357, which is located near a first (e.g., interior-most) longitudinal end of the cavity 320, and a lower outlet (not shown), which is located near a second longitudinal end of the cavity 320 (e.g., near an opening of the cavity 320). The upper outlet 357 is for water flow going to the outlet port 312 (e.g., the shower outlet) and the lower outlet (not shown) is for water flow going to the outlet port 314 (e.g., tub outlet).

The valve cover (e.g., 302 or 303) can include apertures 304(a), 305(a), 306(a), and 307(a) which correspond to threaded holes 304(b), 305(b), 306(b), and 307(b) of the valve body 301. Accordingly, the valve cover (e.g., 302 or 303) can be fastened to the valve body 301 using fasteners, such as screws, etc. The valve cover (e.g., 302 or 303) also can include an aperture 308 for receiving a valve stem 351 of the pressure balancing cartridge 350, as described below.

The valve body 301 can include integral stop valves (i.e., cut-off valves) 315 and 316 and serviceable check valves, which permit flow in a single direction. The integral stop valves 315 and 316 of the valve body 301 provide an important advantage of reducing the center-to-center distance between the stop valve 315 and 316. The inlet ports 311 and 313 can be, for example, a combination of copper sweat fittings and MPT fittings.

Figure 3:
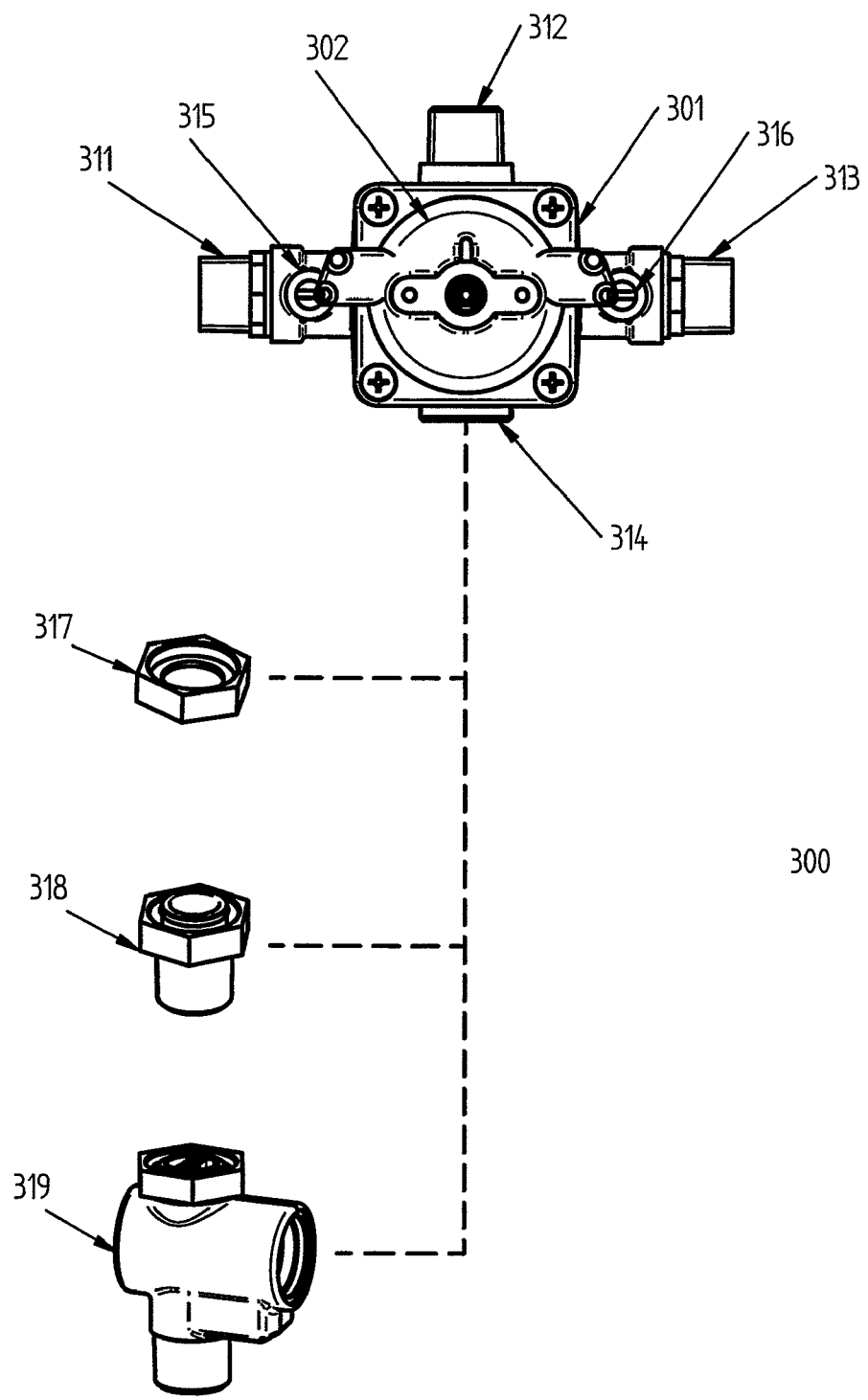
FIG. 3 illustrates a modular valve according to an embodiment of the invention.
Figure 4:
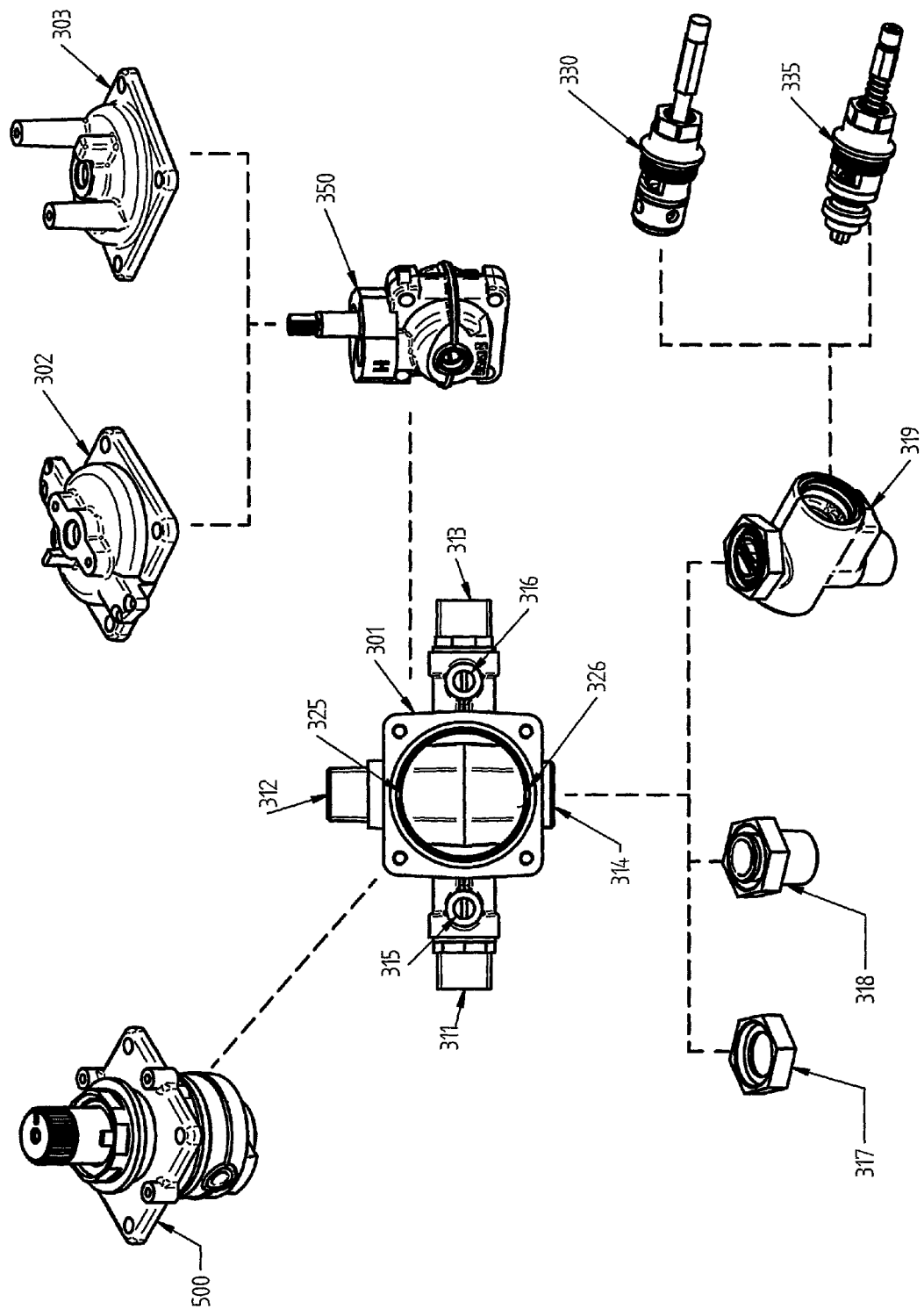
FIG. 4 illustrates an exploded view of a modular valve according to an embodiment of the invention.
Figure 5:
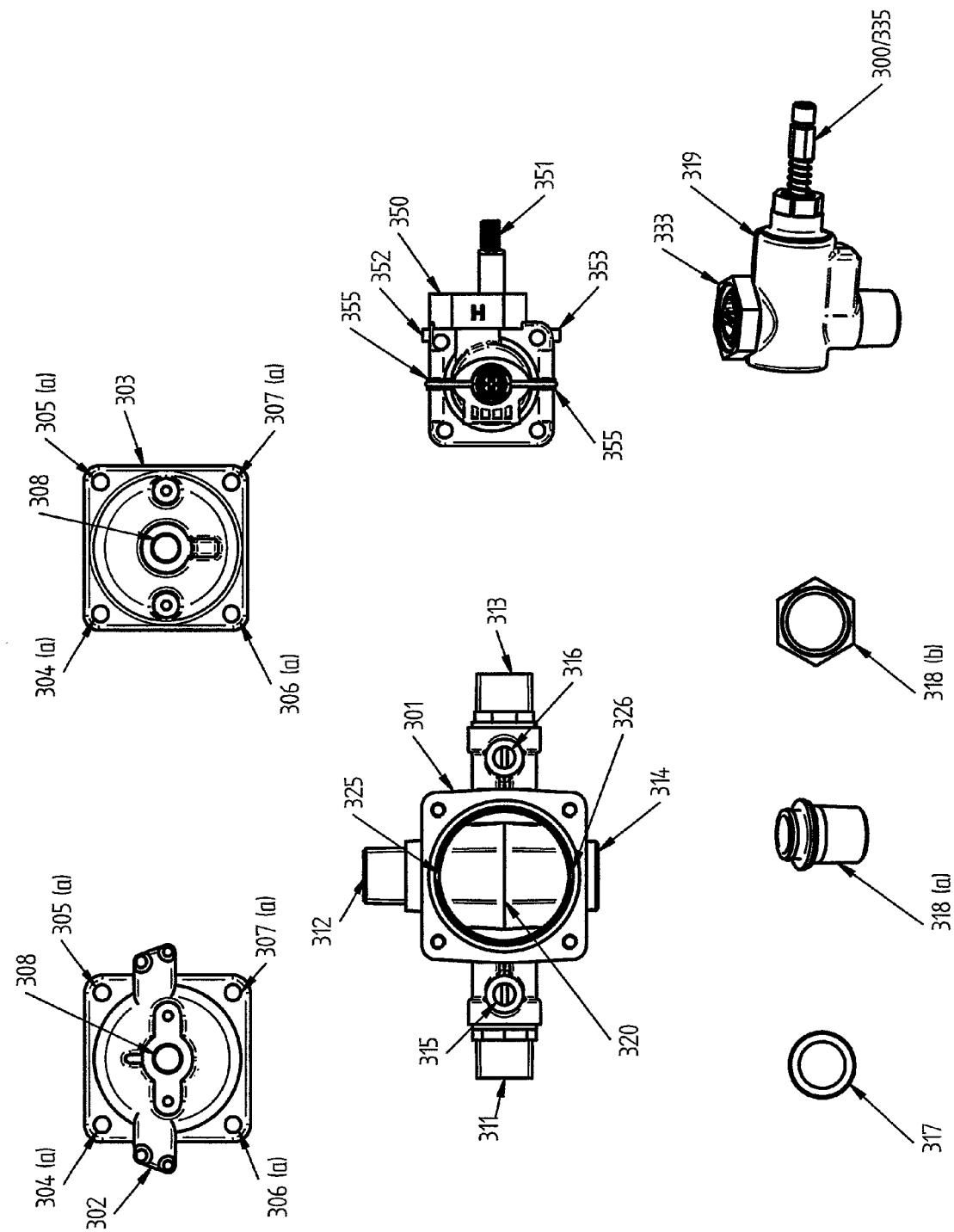
FIG. 5 illustrates another exploded view of a modular valve according to an embodiment of the invention.
Figure 6:
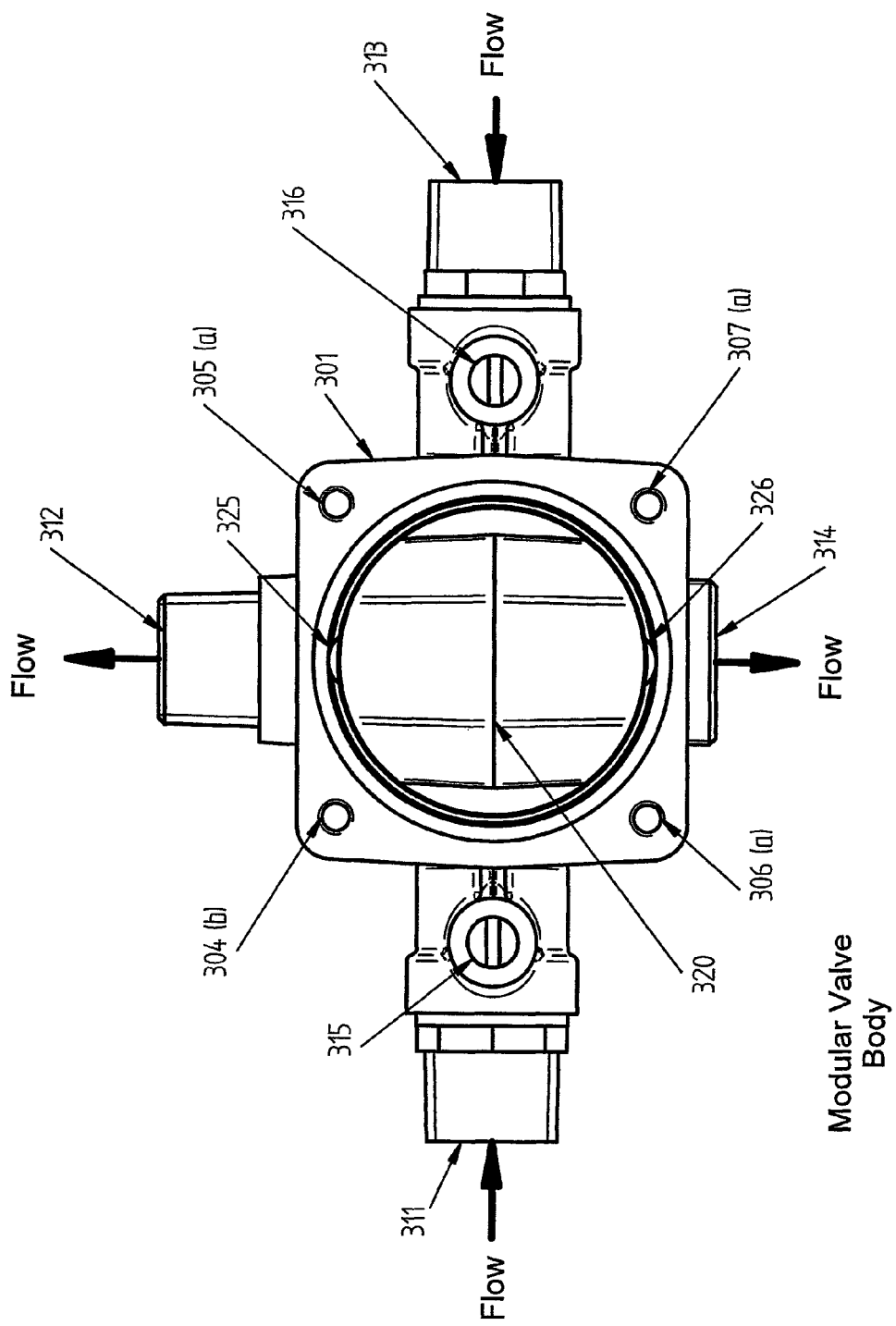
FIG. 6 illustrates a plan view of a modular valve body according to an embodiment of the invention.

As illustrated, for example, in FIGS. 3 and 4, the modular valve 300 can be configured by attaching different outlet connectors, such as outlet connectors 317, 318, and 319, to provide a shower only valve, a tub and shower valve, and a valve with an integral diverter. For example, an outlet cap 317 can be installed on the outlet port 314 to provide a 3-port valve.

Figure 13:
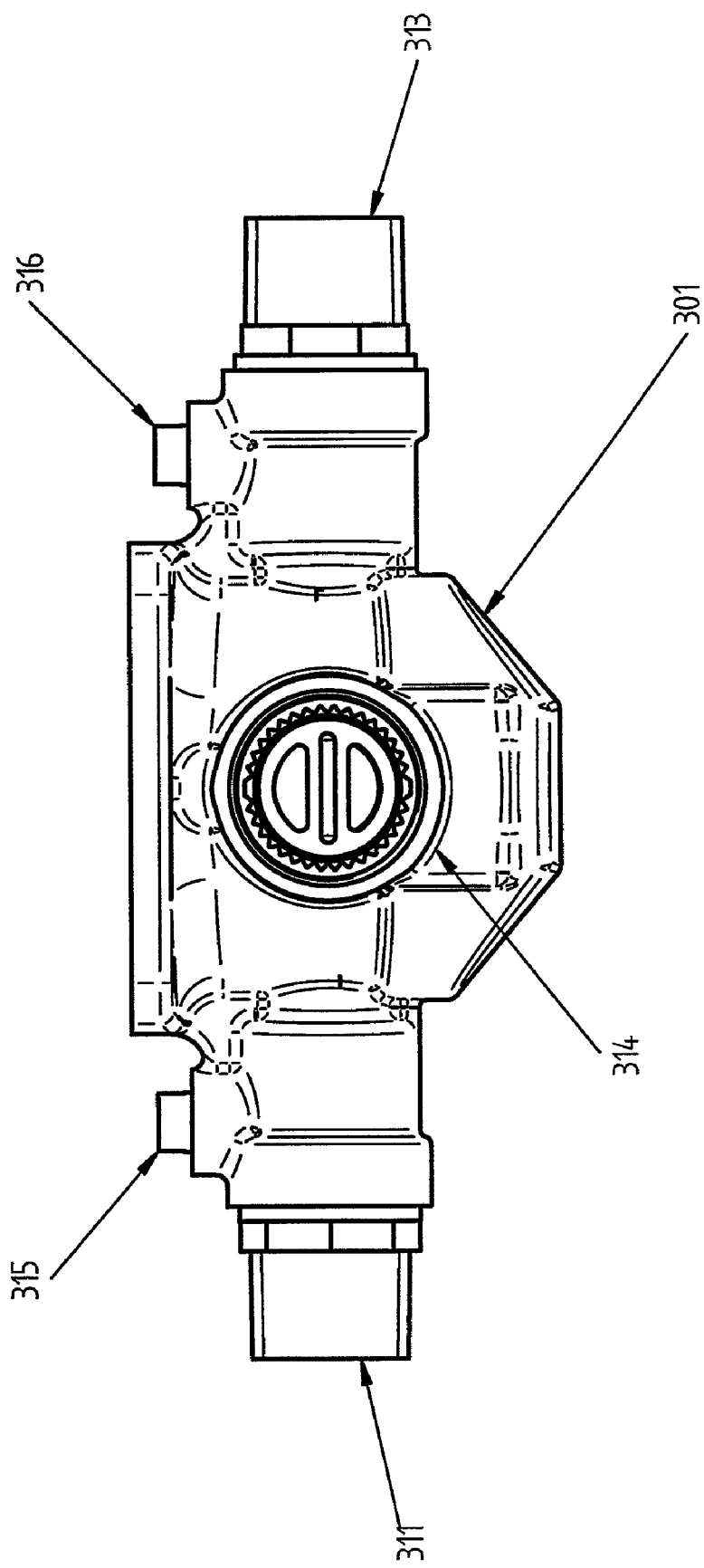
FIG. 13 illustrates a bottom view of a modular valve body according to an embodiment of the invention.

In another embodiment, a duel outlet 318 can be installed on the outlet port 314 to provide a 4-port valve. With reference to FIG. 13, the shape of the outlet port 314 of the valve body 301 in combination with the outlet connection piece (e.g., dual outlet 318) forms a venturi tube to prevent water from flowing to the shower head.

In yet another embodiment, a diverter connection 319 can be installed on the outlet port 314 to provide a 4-port diverter valve. The diverter connection 319 can include a manual diverter 330 or automatic diverter 335.

Accordingly, the modular valve 300 according to the embodiments can be configured in different ways to replace, for example, three conventional, dedicated valve bodies 101, 102, and 103. For example, an embodiment of the invention can provide a modular valve including a valve body having a pair of inlet ports and a pair of outlet ports. The pair of inlet ports each includes an integral stop valve and check valve. The valve body includes a cavity configured to selectively receive a pressure balancing cartridge or a thermostatic assembly. This means that only one modular valve needs to be stocked by the manufacturer, distributor, or plumber, etc., along with the different outlet pieces. Accordingly, the embodiments can provide a streamlined supply chain to the customer.

As described above, the exemplary modular valve body 301 includes a cavity 320 for receiving a pressure balancing cartridge 350 or a thermostatic cartridge assembly (e.g., 500 or 600). An exemplary configuration of the modular valve body 301 and a pressure balancing cartridge 350 will now be described with reference to FIGS. 4-9.

The exemplary pressure balancing cartridge 350 can maintain the outlet set point temperature of the modular valve with changing inlet water pressures. The pressure balancing cartridge 350 also can include a valve stem 351, which can be connected to a handle or knob (not shown). The valve cover (e.g., 302 or 303) can include an aperture 308 for receiving the valve stem 351 of the pressure balancing cartridge 350.

Figure 8A:
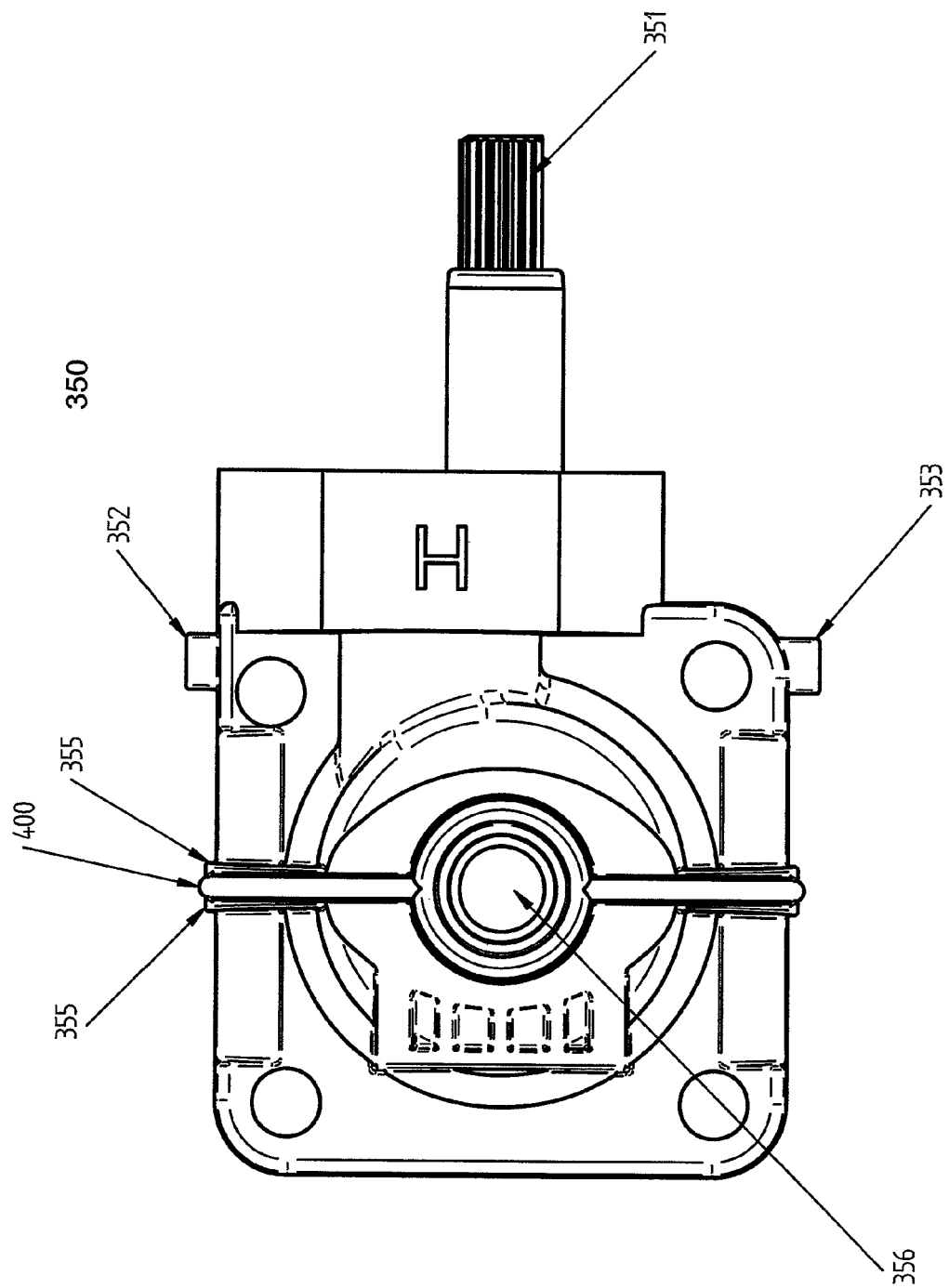
FIG. 8(a) illustrates a pressure balancing cartridge according to an embodiment of the invention.

FIG. 8(a) illustrates an exemplary pressure balancing cartridge 350 according to an embodiment of the invention. The pressure balancing cartridge 350 is received by, or retained in, the cavity 320 of the valve body 301.

In an embodiment, the pressure balancing cartridge 350 can include a locking element for retaining the pressure balancing cartridge 350 in the cavity 320 of the valve body 301. For example, the pressure balancing cartridge 350 can include tabs 352 and 353, which correspond to notches 325 and 326 formed in the valve body 301 adjacent to the opening of the cavity 320. Accordingly, the tabs 352 and 353 can be aligned with, and inserted into, the notches 325 and 326 to ensure a correct alignment of the pressure balancing cartridge 350 in the cavity 320 of the valve body 301. Since the notches 325 and 326 and tabs 352 and 353 are arranged at the opening of the cavity 320, the correct alignment can be easily confirmed. Moreover, the pressure balancing cartridge is prevented from being installed incorrectly.

The symmetry of the tabs 352 and 353 on the pressure balancing cartridge 350 allows the pressure balancing cartridge 350 to be oriented to allow hot or cold water to enter the inlets 356 of the pressure balancing cartridge 350 from either side of the valve body 301. Accordingly, in an embodiment, the position of the pressure balancing cartridge 350 with respect to the cavity 320 of the valve body 301 can be changed (e.g., rotated). That is, the pressure balancing cartridge 350 can be rotated in order to reverse the inlets from hot to cold. In this way, the pressure balancing cartridge 350 can enable the hot and cold inlet ports to be switched.

In another embodiment, the pressure balancing cartridge 350 with the body can form an integral diverter channel. For example, the pressure balancing cartridge 350 can include a component for sealing and dividing the cavity 320 into two separate chambers. In the embodiment, the exterior of the pressure balancing cartridge 350 cooperates with the interior surfaces of the cavity 320 of the valve body 301 to form two separate chambers within the cavity 320 of the valve body 301.

Figure 8B:
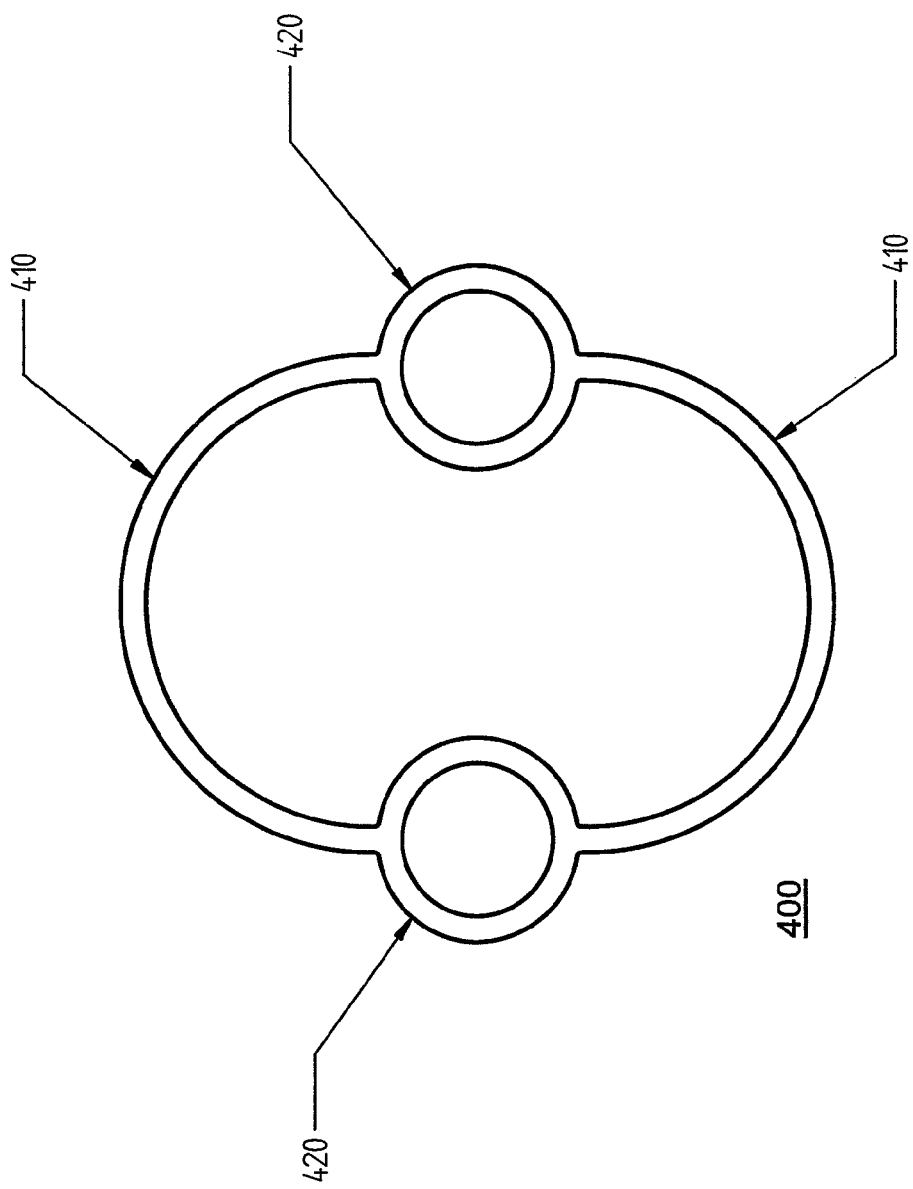
FIG. 8(b) illustrates a radial and inlet O-ring for a pressure balancing cartridge according to an embodiment of the invention shown in FIG. 8(a)
Figure 10A:
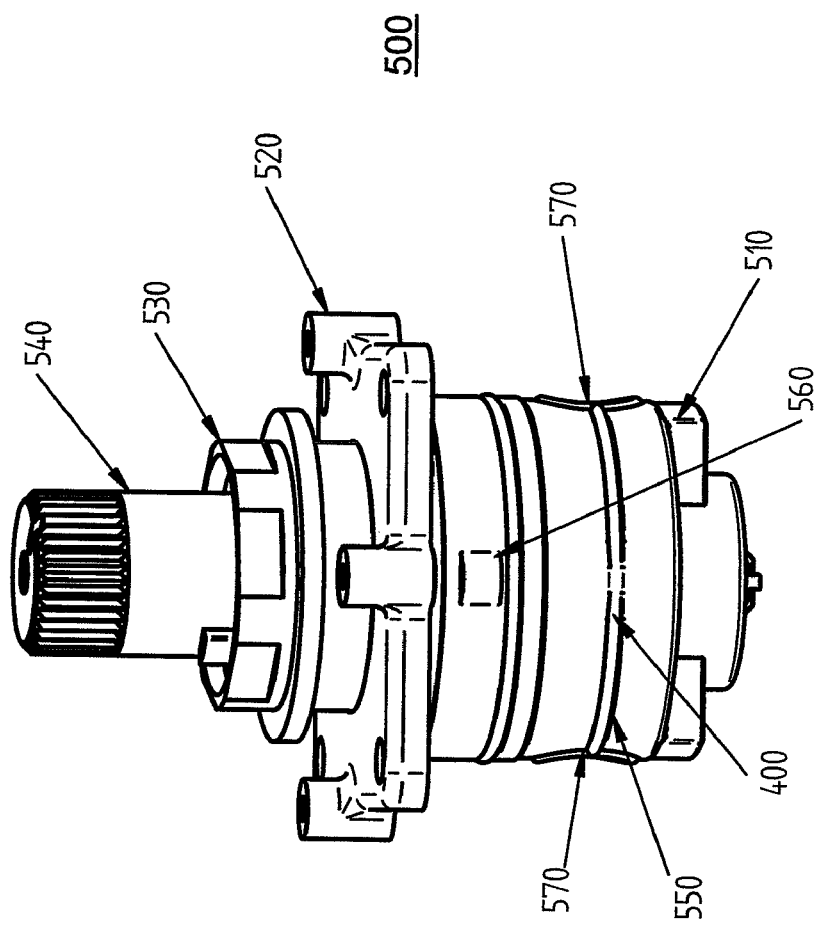
FIG. 10(a) illustrates a thermostatic cartridge assembly according to an embodiment of the invention.
Figure 10B:
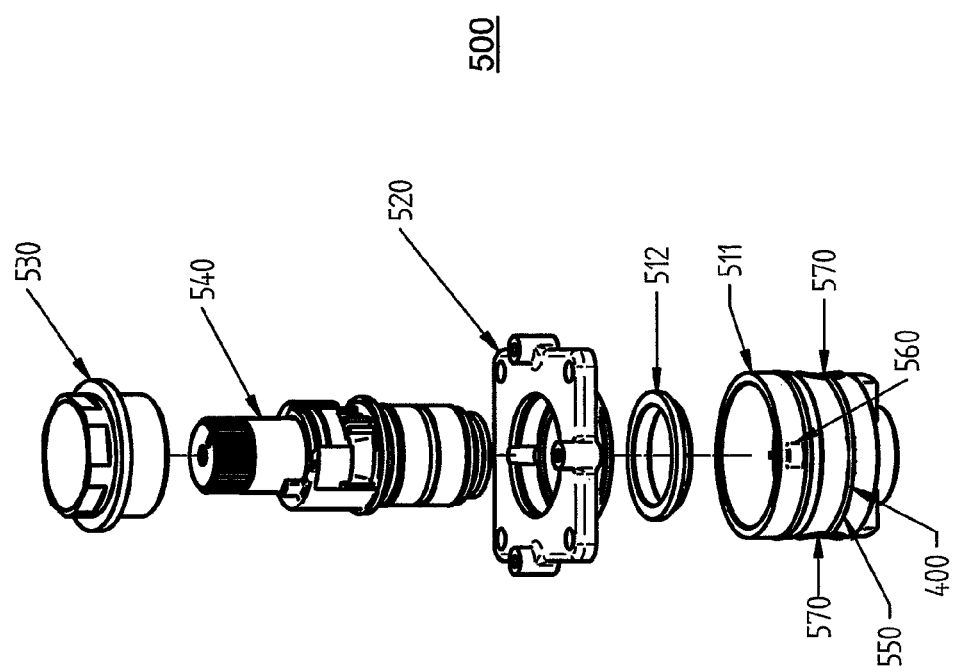
FIG. 10(b) illustrates an exploded view of the thermostatic cartridge assembly shown in FIG. 10(a)
Figure 10C:
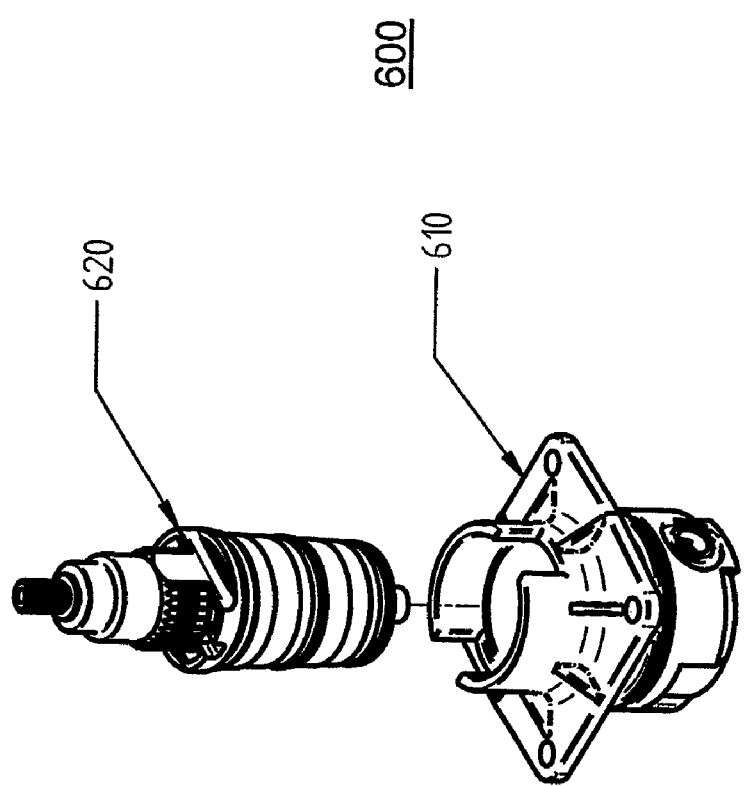
FIG. 10(c) illustrates an exploded view of a thermostatic cartridge assembly according to another embodiment.
Figure 10D:
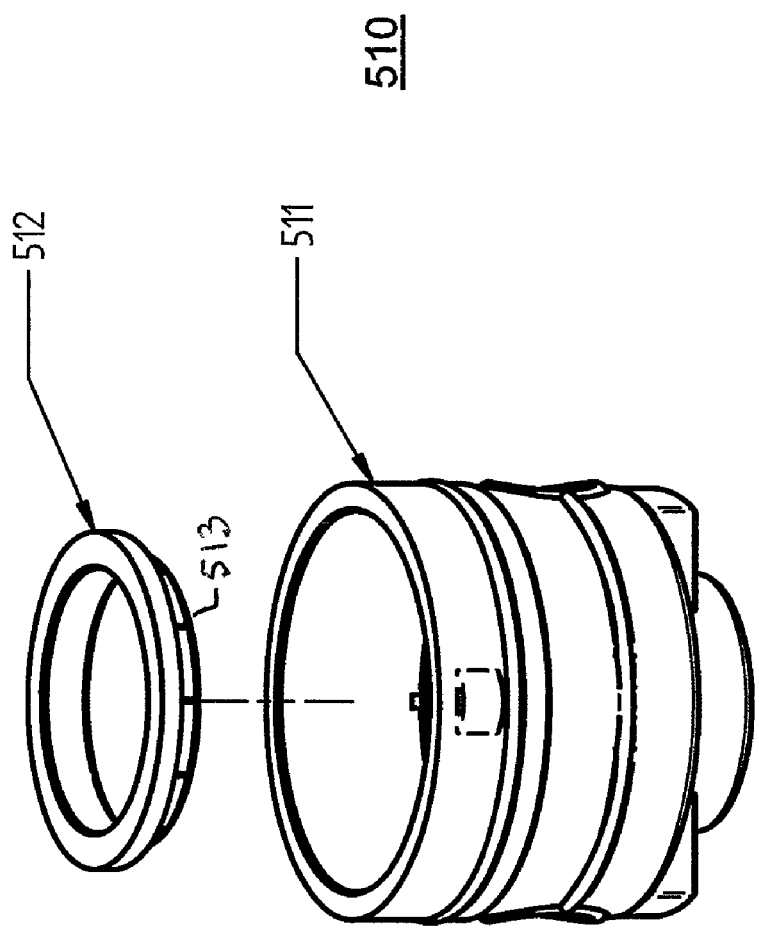
FIG. 10(d) illustrates an exploded view of a holder for a thermostatic cartridge.

In an exemplary embodiment shown in FIG. 8(a), the exterior surface of the pressure balancing cartridge 350 includes one or more guides 355 (e.g., grooves, retaining walls, slots, etc.) that are adapted to receive a radial and inlet O-ring 400, as shown in FIG. 8(b). The radial and inlet O-ring 400 includes radial portions 410 and inlet portions 420. As shown in FIG. 9, the radial portion 410 of the radial and inlet O-ring 400 extends around a central axis of the pressure balancing cartridge 350, and the inlet portions 420 surround each of the inlets 356 of the pressure balancing cartridge 350, thereby spitting the cavity 320 of the valve body 301 into two sections (e.g., a top section and a lower section).

For example, the top section, which is shown on the left-hand side of FIGS. 8(a) and 9, is for water flow going to the outlet port 312 (e.g., shower outlet) via the upper outlet 357 of the cavity 320 (shown in FIG. 7) and the lower section, which is shown on the right-hand side of FIGS. 8(a) and 9, is for flow going to the outlet port 314 (e.g., the tub outlet) via the lower outlet (not shown) of the cavity 320.

Accordingly, the embodiments of the invention can eliminate the need to provide separate channels formed in the body casting for the tub and shower flows, thereby reducing the material needed in the body casting and reducing the overall size of the body. However, other embodiments can include channels and/or passages that are cast or machined into the valve body 301.

In the embodiments illustrated in FIGS. 8(a), 8(b), and 9, the captive radial and inlet O-ring 400 can be separate from the outer casing of the pressure balancing cartridge 350. However, in other embodiments, the radial and inlet O-ring 400 can be integrally formed or molded into the outer casing of the pressure balancing cartridge 350.

According to the embodiments, the radial and inlet O-ring 400 can reduce or shorten the water path to the outlet ports (e.g., the upper outlet port 312 for the shower and lower outlet port 314 for the tub) as compared with conventional valves. Moreover, the embodiments can reduce the number of O-rings, as compared to conventional valves, by providing a single radial and inlet O-ring 400 that facilitates flow to the top section (e.g., upper outlet port 312) and flow to the lower section (e.g., lower outlet port 314).

FIGS. 9(a) and 9(b) illustrate cut-away views of a valve body 301 and pressure balancing cartridge 350, according to an embodiment of the invention. As shown in FIG. 9(a), the embodiment can eliminate the need for an insert (e.g., conventional insert 180, as shown in FIG. 2) at the connection between the pressure balancing valve 350 and the inlet ports 311, 313 having the stop valves 315, 316, respectively. As shown in FIG. 9(b), the embodiments also can eliminate the back channel (e.g., back channel 140, as shown in FIG. 2) used in conventional valves by providing captive radial and inlet O-ring 400. As further shown in FIG. 9(b), the embodiments also can provide visual alignment and seating of the pressure balancing cartridge in the cavity 320 of the valve body 301 by aligning tabs 352, 353 with notches 325, 326.

The modular valve 300 according to embodiments of the invention can use the same arrangement of connections for the shower outlet and tub and shower, and diverter outlet as the conventional valves. Accordingly, the embodiments of the modular valve can reduce costs by allowing the use of existing plumbing configurations for showers, tub and shower, and diverters. The modular valve 300 also can use conventional valve covers. Accordingly, the embodiments of the modular valve can reduce costs by allowing the use of conventional trim with the modular valve.

As described above, the modular valve body 301 includes a cavity 320 for receiving a pressure balancing cartridge 350 or a thermostatic cartridge assembly 500. An exemplary configuration of the modular valve body 301 and thermostatic cartridge assembly 500 will now be described.

According to the embodiment, the modular concept of using a single valve body 301 for different configurations can be extended to using the same valve body 301 for either a pressure balancing valve or a thermostatic cartridge. To convert the modular valve 300 to a thermostatic valve, the pressure balancing cartridge 350 and the valve cover 302 or 303 (if installed) can be removed from the modular valve body 300 and a thermostatic cartridge assembly (e.g., 500 or 600) can be installed therein.

The thermostatic cartridge assembly (e.g., 500 or 600) can include passages to direct water to the inlets of a thermostatic cartridge and provide an element for securing the thermostatic cartridge in the cavity 320 of the valve body 301. In this way, the need for a separate thermostatic valve body can be eliminated. Thus, the modular valve 301 can facilitate field upgrading from a pressure balancing valve to a thermostatic valve.

FIGS. 10(*a*) and 10(*b*) illustrate an exemplary embodiment of a thermostatic cartridge assembly 500. The thermostatic cartridge assembly 500 includes a holder 510, a cover 520, a nut 530, and a thermostatic cartridge 540. The exemplary holder 510 receives the thermostatic cartridge 540 and the cover 520. The nut 530 secures the thermostatic cartridge 540 in the cover 520.

FIG. 10(*d*) illustrates an exploded view of the holder 510, which shows in this exemplary embodiment that the holder 510 can be made of two plastic components, for example, a holder base 511 and a ring 512. The ring 512 can be inserted into the holder base 511 and can be joined together by ultrasonic welding. By joining these components water passages are created to direct water into the thermostatic cartridge 540. The holder 510 becomes an adaptor between the thermostatic valve body 301 and the thermostatic cartridge 540. Further shown are ribs 513 that facilitate in centering the ring 512 into the holder base 511.

One of ordinary skill in the art will recognize that the holder 510, cover 520, and/or nut 530 can be formed by an assembly of separate parts, as shown in the exemplary embodiment of FIGS. 10(*a*) and 10(*b*), or be formed as a unitary part. For example, FIG. 10(*c*) illustrates an embodiment of a thermostatic cartridge assembly 600 including an integral holder 610 for receiving a thermostatic cartridge 620.

According to the embodiment, the thermostatic cartridge assembly 500 is inserted into the cavity 320 of the valve body 301. In an embodiment, the holder 510 includes tabs 560 for engaging the notches 325 and 326 of the valve body 301, thereby facilitating a correct alignment of the thermostatic cartridge assembly 500 in the cavity 320 of the valve body 301. Since the tabs 560 and notches 325 and 326 are arranged at the opening of the cavity 320, the correct alignment can be easily confirmed (i.e., visually confirmed). Moreover, the thermostatic cartridge assembly 500 can be prevented from being installed incorrectly.

The symmetry of the tabs 560 on the holder 510 allows the thermostatic cartridge assembly 500 to be oriented to allow hot or cold water to enter the inlets 570 of the thermostatic cartridge assembly 500 from either side of the valve body 301. Accordingly, in an embodiment, the position of the thermostatic cartridge holder 510 with respect to the cavity 320 of the valve body 301 can be changed (e.g., rotated or reversed). That is, the thermostatic cartridge holder 510 can be rotated in order to reverse the configuration of the hot and cold inlets of the valve body 301. In this way, the thermostatic cartridge holder 510 can enable the hot and cold inlet ports to be switched. In this way, the modular valve 300 can be converted into a modular thermostatic valve (THM-valve). Moreover, the embodiments of the modular valve 300 can provide for field upgrading from a pressure balancing valve to a thermostatic valve, which also reduces manufacturing costs, shipping costs, inventory costs, and/or installation costs.

In an embodiment, the thermostatic cartridge assembly 500 includes an integral diverter channel. For example, the holder 510 of the thermostatic cartridge assembly 500 includes an element for sealing and dividing the cavity 320 of the valve body 301 into two separate chambers. In the embodiment, the exterior of the holder 510 cooperates with the interior surfaces of the cavity 320 of the valve body 301 to form two separate chambers within the cavity 320 of the valve body 301.

In an exemplary embodiment shown in FIGS. 10(*a*) and 10(*b*), the exterior surface of the holder 510 includes one or more guides 550 (e.g., grooves, retaining walls, slots, etc.) that are adapted to receive a radial and inlet O-ring 400, as shown in FIG. 8(*b*). As shown in FIGS. 10(*a*) and 10(*b*), the radial portion 410 of the radial and inlet O-ring 400 extends around a central axis of the holder 510, and the inlet portions 420 surround each of the inlets 570 of the housing 510, thereby splitting the cavity 320 of the valve body 301 into two sections (e.g., a top section and a lower section).

In the embodiments illustrated in FIGS. 10(*a*) and 10(*b*), the captive radial and inlet O-ring 400 can be separate from the outer casing of the housing 510. However, in other embodiments, the radial and inlet O-ring 400 can be integrally formed or molded into the outer casing of the housing 510.

Figure 11:
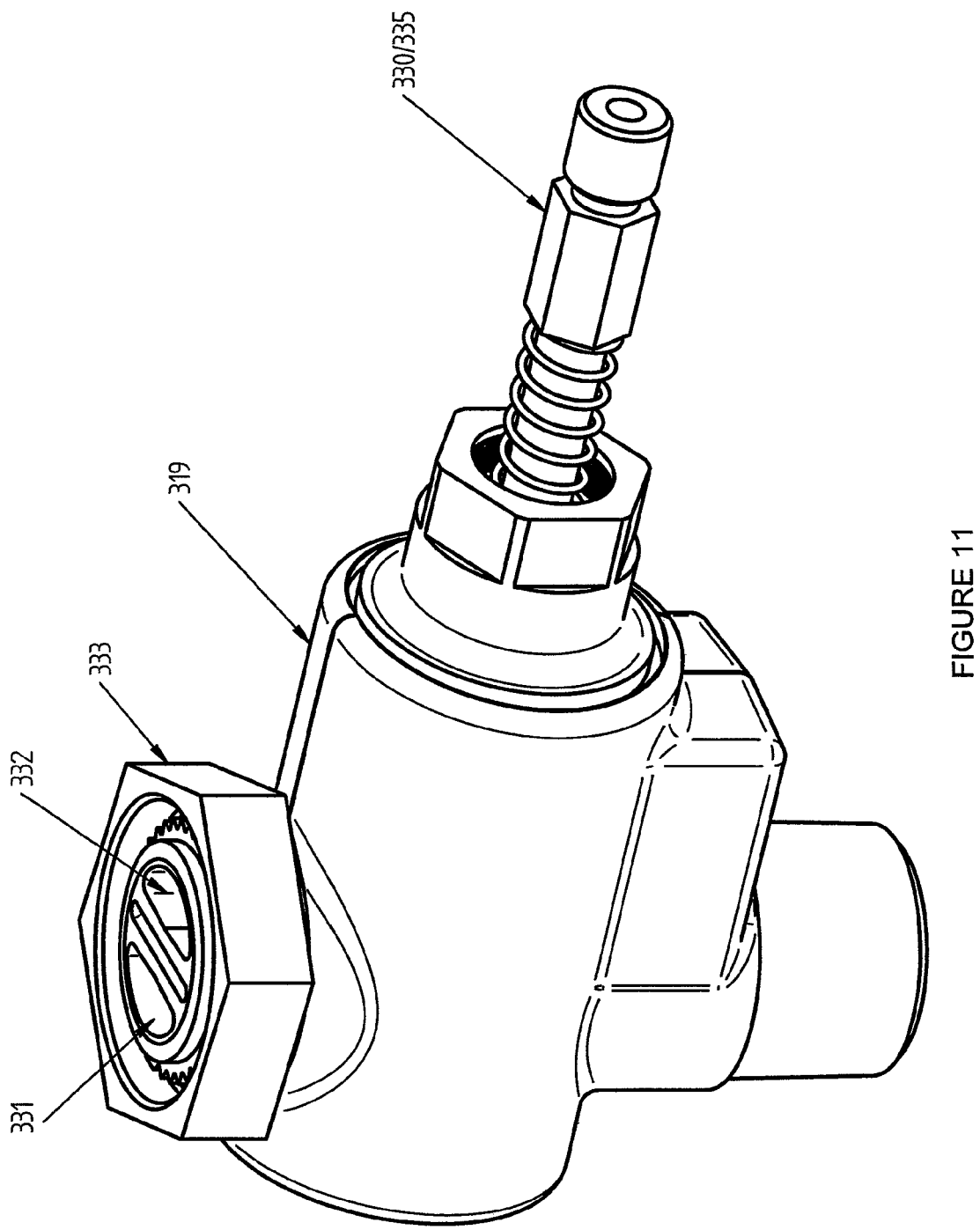
FIG. 11 illustrates a diverter assembly according to an embodiment of the invention.
Figure 12:
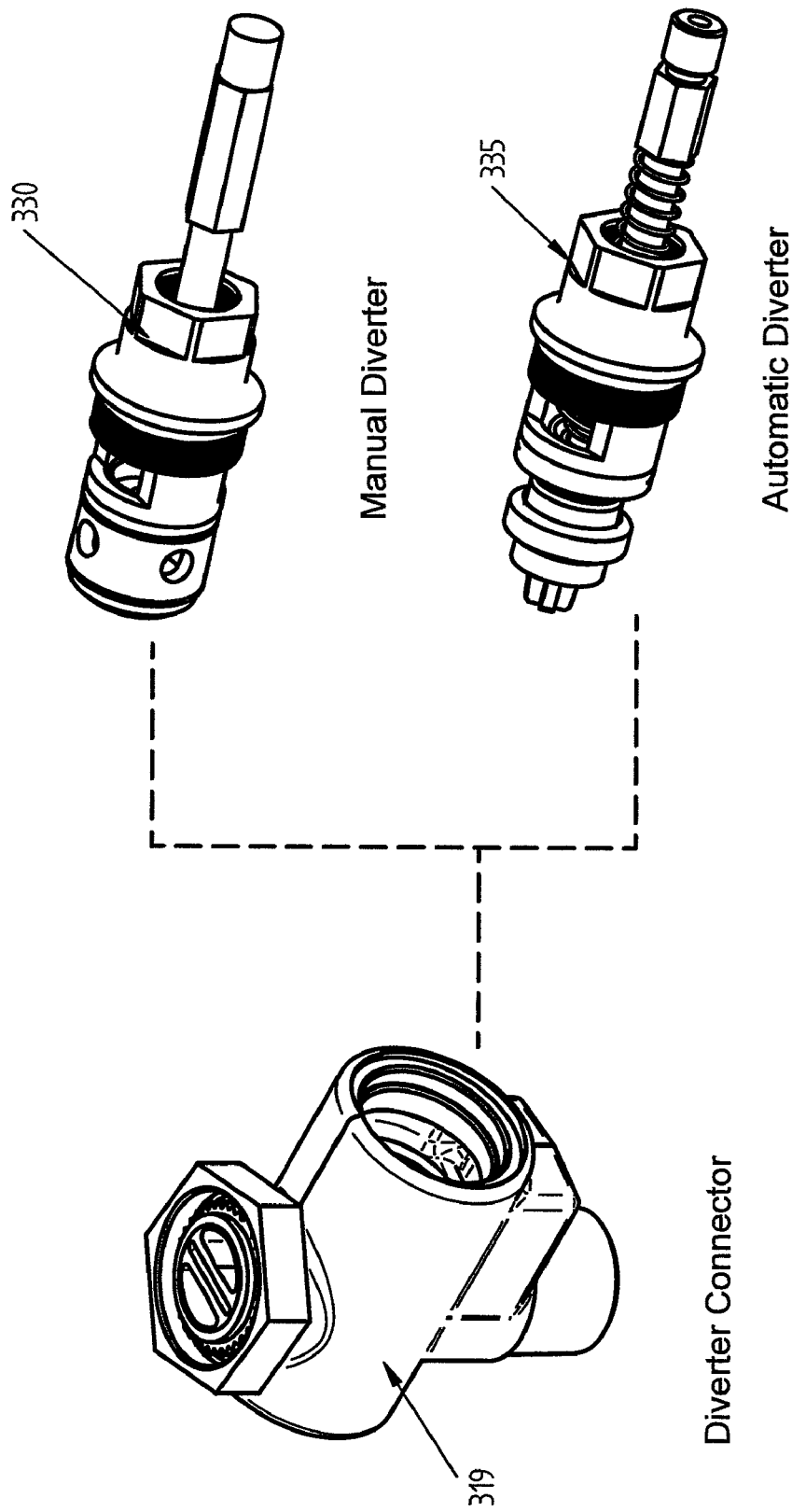
FIG. 12 illustrates a diverter assembly according to an embodiment of the invention.

With reference to FIGS. 11 and 12, a diverter assembly according to an embodiment of the invention will now be described. As shown in FIG. 11, a diverter connection 319 can be provided at the lower outlet port 314. The diverter connection 319 can be formed to receive a manual diverter 330 or an automatic diverter 335. FIG. 12 shows a perspective view of a diverter connection 319 having a diverter 330 or 335. For example, as shown in FIG. 12, the diverter connection 319 can include two openings 331, 332 in the inlet side of the diverter connection 319. The openings 331, 332 can be, for example, half-circles as illustrated in FIG. 12.

The diverter connection 319 can join two separate flow channels (e.g., the tub flow, and the shower flow) from the modular valve to two separate flow channels in an add-on diverter body (e.g., 330 or 335) into a single union. For example, the diverter connection 319 can use a captive threaded nut 333 to hold the diverter connection 319 and the valve body 301 together and a custom seal to prevent leakage out of the joint formed between the valve body 301 and the diverter connection 319 and between the tub 332 and shower passages 331. The embodiment allows for an add-on diverter connection 319 that prevents water from flowing to the tub outlet when in the shower position and water from flowing to the shower outlet when in the tub position. An embodiment of the diverter connection 319 also can incorporate a spline to align the diverter relative to the modular valve body 301. The spline also can resist installation torque that can be applied to the national pipe thread (NPT) on the diverter outlet as well as all use loads.

As noted above, the modular valve 300 according to the embodiments can be configured in different ways to replace, for example, three conventional, dedicated valve bodies 101, 102, and 103. Accordingly, only one modular valve 300 needs to be manufactured, shipped, and stocked by the manufacturer, distributor, or plumber, etc., along with the different outlet pieces. Thus, the embodiments of the invention can provide a streamlined supply chain to the customer.

Further, the exemplary embodiments can eliminate the need for an insert at the connection between the pressure balancing valve 350 and the inlet ports 311, 313 having the stop valves 315, 316, respectively. The embodiments also can eliminate the back channel used in conventional valves by providing a captive radial and inlet O-ring 400. Furthermore, the embodiments can provide visual alignment and seating of the pressure balancing cartridge in the cavity 320 of the valve body 301 by aligning tabs 352, 353 formed on the pressure balancing valve 350 with notches 325, 326 formed in the valve body 301 adjacent to the opening of the cavity 320. Similarly, the embodiments can provide visual alignment and seating of the thermostatic cartridge assembly 500 in the cavity 320 of the valve body 301 by aligning tabs 560 formed on the holder 510 of thermostatic cartridge assembly 500 with the notches 325, 326 formed in the valve body 301 adjacent to the opening of the cavity 320.

As illustrated in the embodiments above, the modular valve can provide a plurality of configurations by attaching different outlet connectors to form, for example, a shower only valve, a tub and shower valve, a valve with an integral diverter, etc. According to embodiments of the invention, a single modular valve body can provide the functionality of three conventional, dedicated valve bodies. According to the embodiments of the invention, only a single valve body needs to be manufactured, shipped, and stocked by the manufacturer, distributor, or plumber along with the different outlet pieces, which improves and streamlines the supply chain to the customer. Moreover, according to the embodiments, fewer valve bodies, and thus, fewer components are needed for each valve configuration.

Furthermore, the overall size of the valve can be reduced, according to the embodiments, compared to the conventional valves. The amount of material needed to manufacture the valves also can be reduced, thereby reducing material costs, weight, etc. of the modular valve. Thus, the modular valve according to the embodiments of the invention can reduce manufacturing costs, shipping costs, inventory costs, and/or installation costs. Moreover, the space requirements for installing the valves also are reduced, thereby simplifying the installation of the valves and increasing the number of available applications of the valve.

According to the embodiments, the need for a separate thermostatic valve body also can be eliminated, thereby further reducing manufacturing costs, inventory costs, and/or installation costs. Moreover, the embodiments of the modular valve can provide for field upgrading from a pressure balancing valve to a thermostatic cartridge, which also reduces manufacturing costs, inventory costs, and/or installation costs.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A pressure balancing cartridge comprising:
an integral diverter channel formed around a central axis of the pressure balancing cartridge and configured to carry fluid diverted from a first outlet toward a second outlet, the integral diverter channel including a radial and inlet O-ring formed around the central axis of the pressure balancing cartridge and surrounding inlets of the pressure balancing cartridge.

2. The pressure balancing cartridge according to claim 1, wherein the radial and inlet O-ring is integrally molded into an outer casing of the pressure balancing cartridge.

3. A modular valve having a valve body, the valve body comprising:
a pair of inlet ports and a pair of outlet ports;
an integral stop valve and check valve being provided for each of the pair of inlet ports; and
a cavity formed within the valve body, the cavity being configured to selectively receive a pressure balancing cartridge or a thermostatic cartridge assembly,
wherein a seal surrounding the pressure balancing cartridge or the thermostatic cartridge assembly contacts the valve body to divide the cavity into a first chamber and a second chamber, the second chamber comprising a diverter channel for carrying fluid diverted from a first one of the pair of outlet ports to a second one of the pair of outlet ports.

4. The modular valve according to claim 3, wherein each of the divided cavities direct water towards either one of the outlet ports.

5. The modular valve according to claim 3, wherein the cavity is configured to receive and retain a holder of the thermostatic cartridge assembly.

6. The modular valve according to claim 3, wherein the valve body includes at least one notch formed adjacent to an opening of the cavity, the at least one notch facilitating alignment of the pressure balancing cartridge or the thermostatic cartridge assembly.

7. The modular valve according to claim 3, further comprising an outlet cap or a dual outlet or a diverter connection connected to one of the pair of outlet ports.

8. The modular valve according to claim 3, wherein one of the pair of outlet ports includes a venturi.

9. The modular valve according to claim 3, wherein the integral diverter channel includes a radial and inlet O-ring formed around a central axis of the pressure balancing cartridge and surrounding inlets of the pressure balancing cartridge.

10. The modular valve according to claim 9, wherein the radial O-ring is integrally molded into an outer casing of the pressure balancing cartridge.

11. The modular valve according to claim 3, wherein the integral diverter channel includes a radial and inlet O-ring formed around a central axis of a holder for the thermostatic cartridge assembly and surrounds inlets of the holder.

12. The modular valve according to claim 11, wherein the radial and inlet O-ring is integrally molded into an outer casing of the holder.

13. The modular valve according to claim 11, wherein the holder is configured to be reversible in the cavity of the valve body.

14. A modular valve comprising:
   a valve body having a pair of inlet ports and a pair of outlet ports, wherein the pair of inlet ports each include an integral stop valve and check valve, and wherein the valve body includes a cavity;
   a holder configured to be retained in the cavity of the valve body;
   a thermostatic cartridge configured to be received in the holder; and
   a cover fixedly attached to the valve body and securing the thermostatic cartridge and the holder in the cavity of the valve body,
   wherein the thermostatic cartridge assembly includes a seal member that in conjunction with the valve body forms an integral diverter channel for carrying fluid diverted from a first one of the pair of outlet ports to a second one of the pair of outlet ports by dividing the cavity into two separate chambers.

15. modular valve according to claim 14, wherein the valve body includes a notch formed adjacent to an opening of the cavity, and wherein the holder includes a tab that engages the notch when the holder is retained in the cavity.

16. A modular valve comprising:
   a cartridge or cartridge assembly having an outer wall, a first end portion and a second end portion; and
   a valve body comprising first and second inlet ports and first and second outlet ports and a cavity for receiving the cartridge or cartridge assembly,
   wherein the cartridge or cartridge assembly includes a seal encircling the outer wall and inlets of the cartridge, and
   wherein the cartridge or cartridge assembly is mounted in the cavity so that the seal engages a wall of the cavity and divides the cavity into a first region around the first end portion and a second region around the second end portion, the first region comprising a diverter channel for carrying fluid from a location near the first outlet to the second outlet.

17. The modular valve according to claim 16, wherein the seal comprises an O-ring.

* * * * *